(12) United States Patent
Huang et al.

(10) Patent No.: US 8,106,603 B2
(45) Date of Patent: Jan. 31, 2012

(54) BACKLIGHT DRIVING CIRCUIT

(75) Inventors: Yu-Liang Huang, Miao-Li (TW); Xiao-Jing Qi, Shenzhen (CN); Zhi-Feng Fu, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 217 days.

(21) Appl. No.: 12/462,044

(22) Filed: Jul. 27, 2009

(65) Prior Publication Data

US 2010/0019695 A1   Jan. 28, 2010

(30) Foreign Application Priority Data

Jul. 25, 2008   (CN) .......................... 2008 1 0142612

(51) Int. Cl.
*G05F 1/00*   (2006.01)
(52) U.S. Cl. ........................................ 315/297; 315/308
(58) Field of Classification Search .................. 315/297, 315/307, 308
See application file for complete search history.

(56) References Cited

U.S. PATENT DOCUMENTS

| | | | |
|---|---|---|---|
| 7,317,403 B2 * | 1/2008 | Grootes et al. | 340/815.45 |
| 7,332,699 B2 | 2/2008 | Nishimura | |
| 7,791,584 B2 * | 9/2010 | Korcharz et al. | 345/101 |
| 2005/0058450 A1 | 3/2005 | Yamamoto et al. | |
| 2006/0132402 A1 * | 6/2006 | Yu | 345/83 |
| 2007/0091057 A1 * | 4/2007 | Lee et al. | 345/102 |
| 2007/0103093 A1 * | 5/2007 | Hagen et al. | 315/291 |
| 2008/0012510 A1 * | 1/2008 | Po | 315/308 |
| 2010/0308738 A1 * | 12/2010 | Shteynberg et al. | 315/185 R |
| 2010/0308739 A1 * | 12/2010 | Shteynberg et al. | 315/193 |
| 2010/0315840 A1 * | 12/2010 | Cohen | 363/21.04 |

FOREIGN PATENT DOCUMENTS

| | | |
|---|---|---|
| CN | 1595254 A | 3/2005 |
| CN | 1972541 A | 5/2007 |

* cited by examiner

*Primary Examiner* — Shawki S Ismail
*Assistant Examiner* — Thienvu Tran
(74) *Attorney, Agent, or Firm* — Altis Law Group, Inc.

(57) ABSTRACT

A backlight driving circuit includes a light driving unit, which includes a constant current unit, and a light source operated by the constant current unit. The light driving unit further includes a feedback control unit and a detection circuit. The detection circuit detects the light source and outputs at least a voltage feedback signal to the feedback control unit. The feedback control unit obtains a prestored power parameter corresponding to the voltage feedback signal and outputs an adjusting signal to the constant current unit to adjust the constant current of the light source.

18 Claims, 2 Drawing Sheets

BACKLIGHT DRIVING CIRCUIT

BACKGROUND

1. Technical Field

The present disclosure relates to a backlight driving circuit.

2. Description of Related Art

In order to display an image, liquid crystals in a liquid crystal display (LCD) panel, require illumination from a light source such as a backlight module. A common backlight driving circuit includes a plurality of LEDs and a control circuit which controls the operation of the LEDs. Thus, the luminous intensity of the LEDs will decline as the luminescence time goes on. The liquid crystal display will display the image abnormally, and reduce the reliability of the liquid crystal display. The backlight driving circuit needs a backlight feedback circuit to feedback the intensity of the LEDs in time to control the LEDs effectively.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Figure 1:
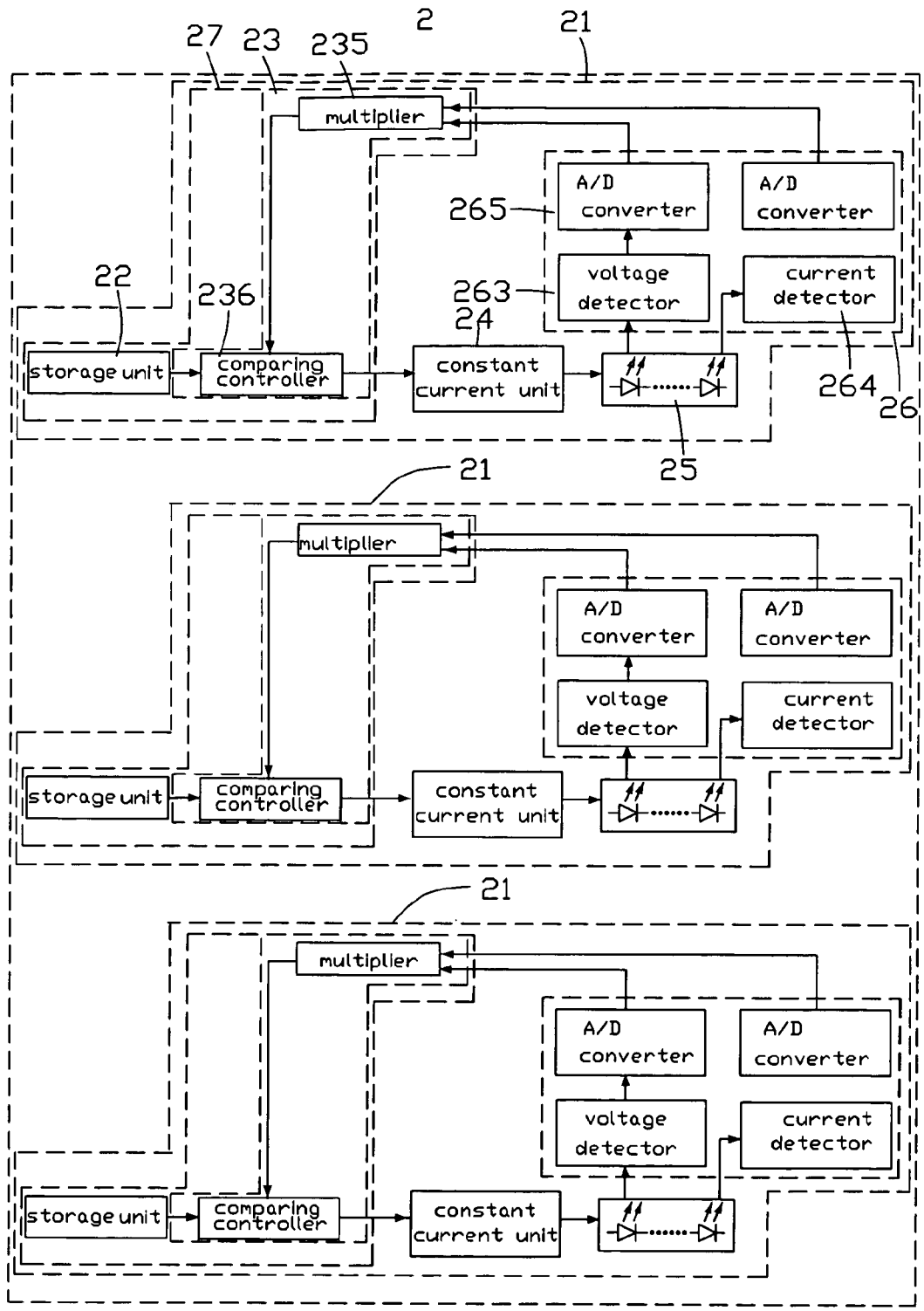
FIG. 1 is a circuit diagram of a backlight driving circuit according to the present disclosure.

FIG. 1 is a circuit diagram of a backlight driving circuit 2 according to a first embodiment of the present disclosure. The backlight driving circuit 2 includes three light driving units 21. The three light driving units 21 drive red, green, blue LEDs respectively. The three light driving units 21 have the similarly structures, and only differ in the color of the LEDs. Take the light driving unit 21 which drives the red LED as an example, the structure of the three light driving units 21 is described as bellows.

The light driving unit 21 includes a feedback control unit 27, a constant current unit 24, a light source 25, and a detection circuit 26. The constant current unit 24 derives the light source 25. The detection circuit 26 detects the light source 25 and outputs a feedback signal to the feedback control unit 27. The feedback control unit 27 adjusts the driving signals of the constant current unit 24 according to the feedback signal.

The feedback control unit 27 includes a storage unit 22 and a driving controller 23. The storage unit 22 is connected to the driving controller 23. The storage unit 22 prestores a current parameter and a prestored power parameter. The driving controller 23 reads the current parameter and the prestored power parameter.

The light driving unit 21 includes a feedback control unit 27, a constant current unit 24, a light source 25, and a detection circuit 26. The constant current unit 24 drives the light source 25. The detection circuit 26 detects the light source 25 and outputs a feedback signal to the feedback control unit 27. The feedback control unit 27 adjusts the driving signals of the constant current unit 24 according to the feedback signal.

The light source 25 includes a plurality of red LEDs in series. The constant current unit 24 outputs a constant current to driving the red LEDs.

The detection circuit 26 includes a voltage detector 263, a current detector 264, and two A/D converters (Analog to Digital converters) 265. One A/D converter 265 is connected to the voltage detector 263 and the light source 25 in series. The other A/D converter 265 is also connected to the current detector 264 and the light source 25 in series. The two A/D converters 265 are both connected to the multiplier 235.

When the light driving units 21 works, the driving controller 23 reads the current parameter from the storage unit 22 to control the constant current unit 24 to output a constant current to the light source 25 corresponding to the current parameter. Then, the voltage detector 263 detects the voltage of the light source 25 and outputs a voltage feedback signal to the corresponding A/D converter 265. Meaning while, the current detector 264 detects the current of the light source 25 and outputs a current feedback signal to the other corresponding A/D converter 265. The two A/D converters 265 converters the voltage feedback signal to a voltage data signal and converters the current feedback signal to a current data signal, respectively. The multiplier 235 receives the voltage data signal and the current data signal, and multiplies the voltage data signal, and the current data signal, and output a feedback power parameter to the comparing controller 236. The comparing controller 236 compares the feedback power parameter with the prestored power parameter in the storage unit 22. When the feedback power parameter is lower than the prestored power parameter, the comparing controller 236 outputs an adjusting signal to the constant current unit 24. The constant current unit 24 outputs a higher constant current to the light source 25 to increase the intensity of the red LEDs.

Compared with the prior art, the feedback control unit 27 obtains the feedback power parameter of the light source 25 in real time and adjust the constant current of the light source 25. So the backlight driving circuit 2 can adjust the constant current of the light source 25 in real time to keep the intensity of the LEDs. The backlight driving circuit 2 can control the LEDs effectively.

Figure 2:
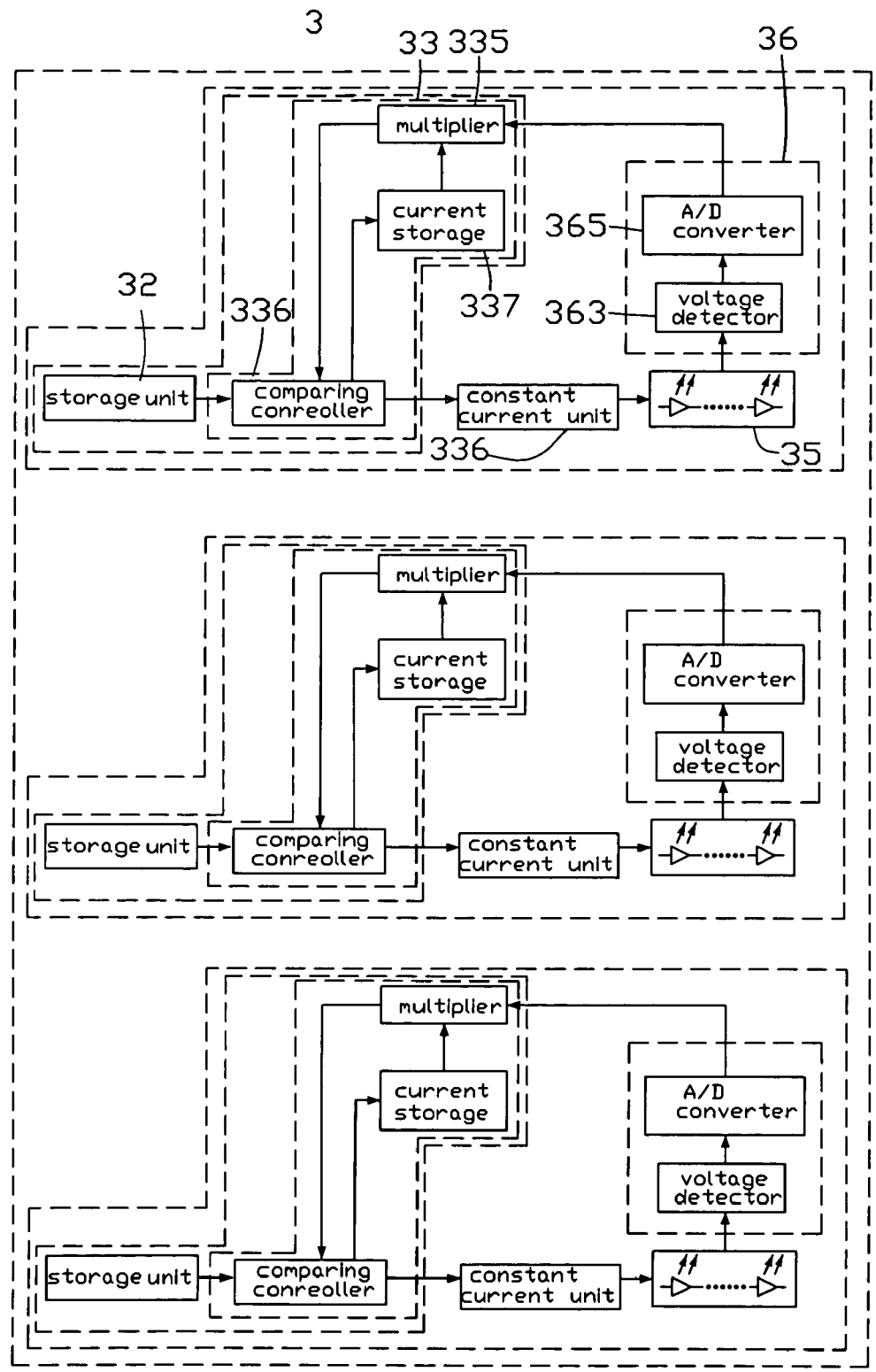
FIG. 2 is a circuit diagram of a backlight driving circuit according to the other embodiment.

FIG. 2 is a circuit diagram of a backlight driving circuit 3 according to a second embodiment of the present disclosure. The backlight driving circuit 3 has the similar structure to the backlight driving circuit 2. The difference is as follows: a detection circuit 36 only includes a voltage detector 363 and an A/D converter 365. The detection circuit 36 outputs a voltage data signal to a multiplier 335. The driving controller 33 further includes a current storage 337 which stores the current parameter in real time from the comparing controller 336. The multiplier 335 multiplies the current parameter and the voltage data signal and outputs a power feedback signal parameter to the comparing controller 336. The comparing controller 336 compares the feedback power parameter with the prestored power parameter in the storage unit 32. When the feedback power parameter is lower than the prestored power parameter, the comparing controller 336 outputs an adjusting signal to the constant current unit 34. The constant current unit 34 outputs a higher constant current to the light source 35 to keep the intensity of the red LEDs.

Compared to the first embodiment, the backlight driving circuit 3 needn't a current detector. The current storage 337 receives the current parameter from the comparing controller 336. So the backlight circuit 3 control the light source 35 effectively more simply than the backlight driving circuit 2.

It is to be understood that even though numerous characteristics and advantages of the present embodiments have been set forth in the foregoing description with details of the structures and functions of the embodiments, the disclosure is illustrative only, and changes made in detail, especially in matters of shape, size, and arrangement of parts, within the principles of the embodiments, to the full extent indicated by the broad general meaning of the terms in which the appended claims are expressed.

What is claimed is:

1. A backlight driving circuit comprising:
at least a light driving unit, comprising a constant current unit, and a light source operated by the constant current unit;
wherein the light driving unit further comprises a feedback control unit and a detection circuit, the detection circuit detects the light source and outputs at least a voltage feedback signal to the feedback control unit, the feedback control unit obtains a feedback power parameter corresponding to the voltage feedback signal, compares the feedback power parameter to a prestored power parameter, and outputs an adjusting signal according to the comparison result to the constant current unit to adjust the constant current of the light source, wherein the feedback control unit comprises a multiplier for calculating the feedback power parameter.

2. The backlight driving circuit of claim 1, wherein the feedback control unit comprises a driving controller configured for comparing the feedback power parameter to a prestored power parameter and outputting the adjusting signal to the constant current unit.

3. The backlight driving circuit of claim 2, wherein the detection circuit comprises a voltage detector, a current detector, and two analog to digital (A/D) converters, one A/D converter is connected to the voltage detector and the light source in series, the other A/D converter is also connected to the current detector and the light source in series, and the two A/D converters are both connected to the multiplier.

4. The backlight driving circuit of claim 2, wherein the feedback control circuit further comprises a current storage storing a current parameter from the driving controller.

5. The backlight driving circuit of claim 4, wherein the detection circuit detects the voltage of the light source, and sends a voltage data signal as the voltage feedback signal to the feedback control unit.

6. A backlight driving circuit comprising:
at least one light driving unit, each light driving unit comprising a constant current unit, and a light source operated by the constant current unit;
wherein each light driving unit further comprises a feedback control unit and a detection circuit, the detection circuit detects the light source and outputs voltage feedback signal to the feedback control unit, the feedback control unit generates a feedback power parameter corresponding to the voltage feedback signal, compares the feedback power parameter to a prestored power parameter, and outputs an adjusting signal according to the comparison result to control the constant current unit to driving the light source emitting in a constant power, wherein the feedback control unit comprises a multiplier configured for calculating the feedback power parameter.

7. The backlight driving circuit of claim 6, wherein the feedback control unit comprises a driving controller configured for comparing the feedback power parameter to a prestored power parameter and outputting the adjusting signal to the constant current unit.

8. The backlight driving circuit of claim 7, wherein the detection circuit comprises a voltage detector, a current detector, and two analog to digital (A/D) converters, one A/D converter is connected to the voltage detector and the light source in series, the other A/D converter is also connected to the current detector and the light source in series, and the two A/D converters are both connected to the multiplier.

9. The backlight driving circuit of claim 7, wherein the feedback control circuit further comprises a current storage storing a current parameter from the driving controller.

10. The backlight driving circuit of claim 9, wherein the detection circuit detects the voltage of the light source, and sends a voltage data signal as the voltage feedback signal to the feedback control unit.

11. The backlight driving circuit of claim 10, wherein the multiplier reads the current parameter from the current storage and multiplies the voltage feedback signal and the current parameter to obtain the feedback power parameter.

12. The backlight driving circuit of claim 8, wherein the current detector detects a current flowing through the light source and sends a current data signal as a current feedback signal to the multiplier, the voltage detector detects a voltage of the light source, and sends a voltage data signal as the voltage feedback signal to the multiplier, and the multiplier multiplies the feedback power parameter according to the current data signal and the voltage data signal.

13. The backlight driving circuit of claim 6, wherein when the feedback power parameter is lower than the prestored power parameter, the driving controller outputs the adjusting signal to control the constant current unit increases the current flowing through the light source.

14. The backlight driving circuit of claim 5, wherein the multiplier reads the current parameter from the current storage and multiplies the voltage feedback signal and the current parameter to obtain the feedback power parameter.

15. The backlight driving circuit of claim 3, wherein the current detector detects a current flowing through the light source and sends a current data signal as a current feedback signal to the multiplier, the voltage detector detects a voltage of the light source, and sends a voltage data signal as the voltage feedback signal to the multiplier, and the multiplier multiplies the feedback power parameter according to the current data signal and the voltage data signal.

16. The backlight driving circuit of claim 1, wherein when the feedback power parameter is lower than the prestored power parameter, the driving controller outputs the adjusting signal to control the constant current unit increases the constant current of the light source.

17. A backlight driving circuit comprising:
at least a light driving unit, comprising a constant current unit, and a light source operated by the constant current unit;
wherein the light driving unit further comprises a feedback control unit and a detection circuit, the detection circuit detects the light source and outputs at least a voltage feedback signal to the feedback control unit, and the feedback control unit obtains a feedback power parameter corresponding to the voltage feedback signal, and outputs an adjusting signal to the constant current unit to adjust the constant current of the light source;
wherein the feedback control unit comprises a driving controller configured for comparing the feedback power parameter to a prestored power parameter and outputting the adjusting signal to the constant current unit, and the detection circuit comprises a voltage detector, a current detector, and two analog to digital (A/D) converters, one A/D converter connected to the voltage detector and the light source in series, the other A/D converter connected to the current detector and the light source in series, the two A/D converters both connected to a multiplier.

18. The backlight driving circuit of claim 17, wherein the multiplier is configured for calculating the feedback power parameter.

* * * * *